A. G. HATCH.
ROLLING APPARATUS FOR MAKING BUILDING BLOCKS.
APPLICATION FILED JAN. 7, 1921.
1,406,856.
Patented Feb. 14, 1922.
2 SHEETS—SHEET 2.
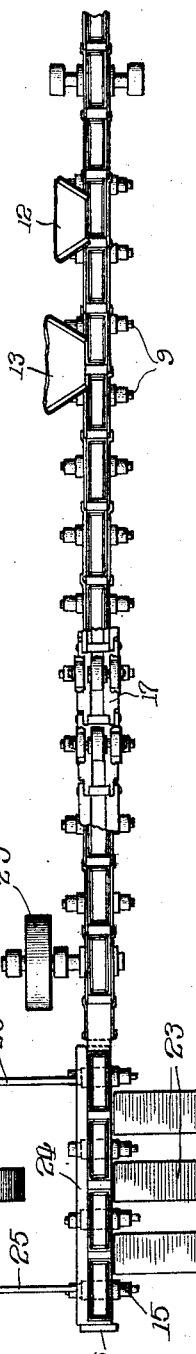
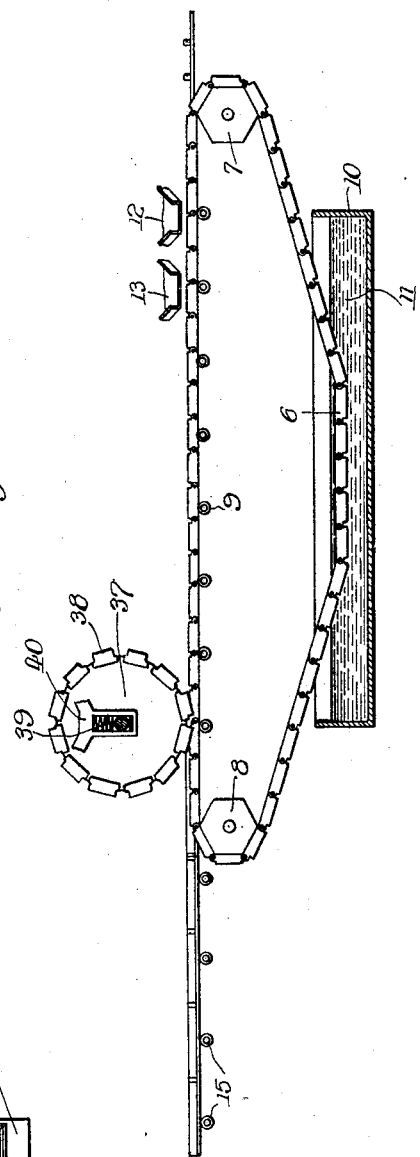
Inventor:
Arthur G. Hatch,
By L. Anthony Usina
Atty.
Witness:
A. J. Sauser

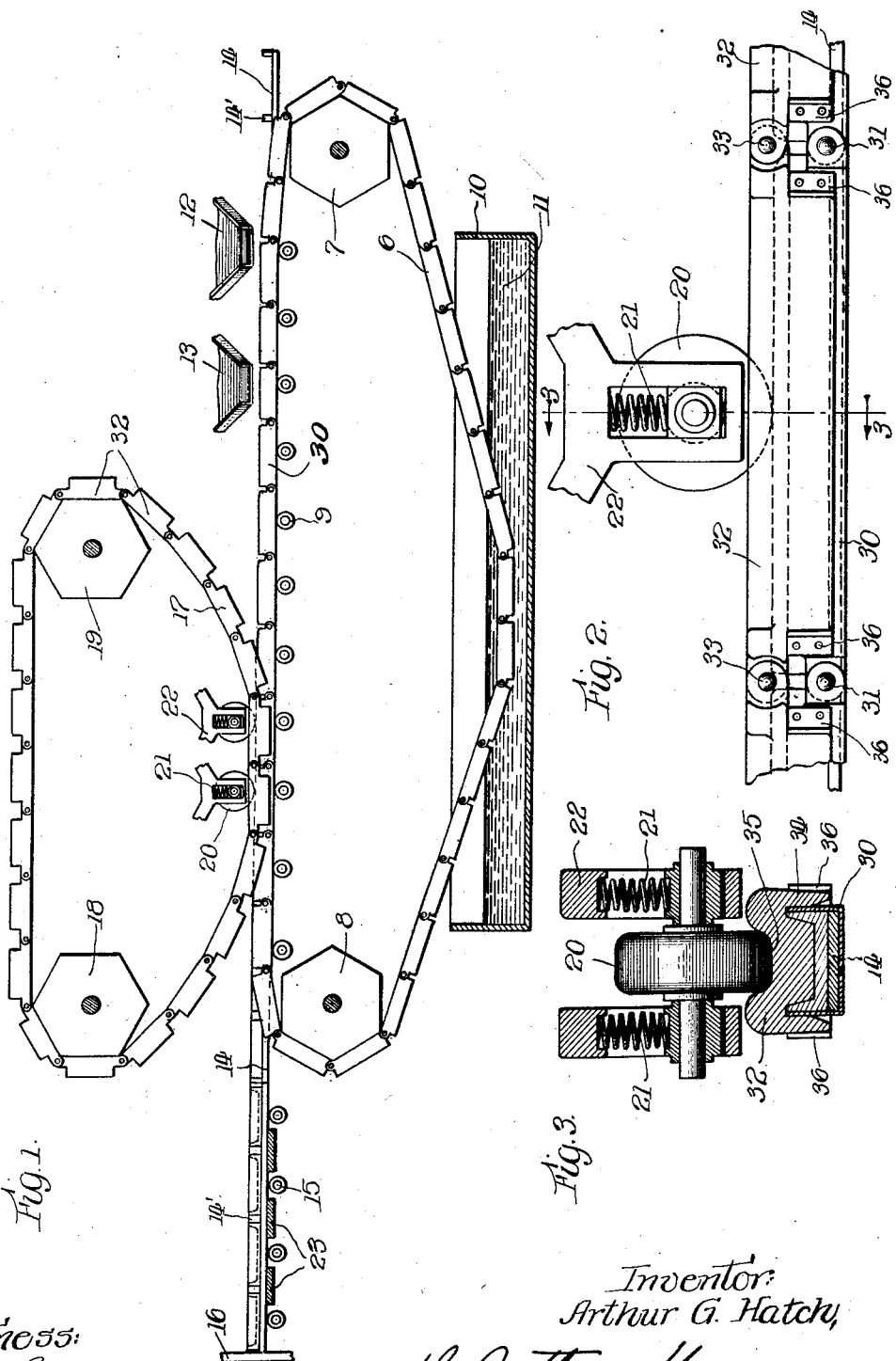

UNITED STATES PATENT OFFICE.

ARTHUR G. HATCH, OF DULUTH, MINNESOTA.

ROLLING APPARATUS FOR MAKING BUILDING BLOCKS.

1,406,856.

Specification of Letters Patent.  Patented Feb. 14, 1922.

Application filed January 7, 1921.  Serial No. 435,596.

*To all whom it may concern:*

Be it known that I, ARTHUR G. HATCH, a citizen of the United States, residing at Duluth, in the county of St. Louis and State of Minnesota, have invented certain new and useful Improvements in Rolling Apparatus for Making Building Blocks, of which the following is a specification.

This invention relates to a new and improved apparatus for the construction of molded building blocks, and more specifically to a method whereby the material is placed, compressed and formed in the molds by a continuous process.

In the construction of cement blocks in fixed molds a very large quantity of molds and other apparatus and large layouts are required when making the blocks in quantities. Moreover, a large amount of hand labor is required in the tamping and forming of the blocks in the mold. It is also difficult to secure uniform tamping and filling and therefore to secure blocks of uniform strength and texture.

It is an object of the present invention to provide block-making apparatus wherein the concrete or other block-forming material is treated by rolling or rocking mechanical compacting process and wherein the operation is carried forward continuously through a molding and compacting machine.

It is a further object to provide an apparatus of this character which is comparatively simple in construction and which requires a minimum amount of hand labor.

Other and further objects will appear as the description proceeds.

My invention broadly comprises a conveyor system adapted to receive the block-forming mixture and to carry it forward under compressing elements which register with the carrying conveyor and serve to compact and form the blocks.

I have illustrated certain preferred embodiments of my invention in the accompanying drawings, in which—

Figure 1 is a diagrammatic elevation of the apparatus;

Figure 2 is a fragmentary view of a portion of Figure 1 on an enlarged scale;

Figure 3 is a section taken on line 3—3 of Figure 2;

Figure 4 is a plan view of the type of apparatus shown in Figure 1; and,

Figure 5 is a view similar to Figure 1, but showing a modified form of the apparatus.

Referring first to the form of apparatus shown in Figures 1 to 4, the conveyor 6 is carried upon the two hexagonal pulleys 7 and 8 and has its upper or working run supported by the series of rollers 9. The lower run of the conveyor passes through a reservoir 10 partly filled with a washing liquid 11. The chutes 12 and 13 are located in such position as to deliver material to the conveyor. The block-carrying pallets or planks 14 are interfitted in the bottom of the conveyor 6. The roll table 15 is provided at the delivery end of the conveyor and has a stop 16. The compression conveyor 17 is carried by the hexagonal pulleys 18 and 19 and has a portion of its lower run held in engagement with the conveyor 6 by means of the rollers 20 which are urged downwardly by the springs 21. These rollers are carried by any suitable journal construction 22.

As shown in Figure 4, the roll table 15 is provided with the delivery members 23. The delivery pusher 24 is actuated by the arms 25 connected to the shaft of the pulley 26 by the arms 27. This pusher is adapted to thrust the block-containing pallets onto the car 28.

The conveyor 6 is driven by means of a pulley 29 located upon the shaft of the pulley 8. As shown in detail in Figures 2 and 3, the conveyor 6 comprises a plurality of U-shaped members 30 connected by pivot pins 31. The conveyor 17 comprises a plurality of members 32 connected by pivots 33. These members 32 have outer flanges 34 adapted to engage the outer surfaces of the side flanges of the conveyor members 30. The lower faces of the members 32 are formed to correspond to the desired block contour and then the upper surface is provided at 35 with a depressed portion adapted to receive the compressing rollers 20. The members 30 are provided with the laterally extending lugs 36 which are adapted to engage the forward and rear ends of the outer flanges 34 of the upper conveyor members 32. This engagement serves to keep the two conveyors in proper registration and also serves to transmit the movement of the conveyor 6 to the conveyor 17.

The form of the device shown in Figure 5 is generally similar to that shown in Figures 1 to 4, the difference consisting in the fact that the upper compacting system comprises a wheel 37 having the caterpillar treads 38. The axle of the wheel is urged downwardly by springs 39 carried in suitable journal members 40. The tread members 38 are similar in design to the members 32 of the conveyor 17 shown in Figures 1 to 4 and serve the same purpose.

In the use of the apparatus, power is applied to the pulley 29, thus putting in motion the conveyor 6 and through its interlocking engagement the conveyor 17. The block-receiving pallets 14 are placed in the lower conveyor, their division lugs 14' corresponding to the pivots between adjacent conveyor sections 30. The block-forming material is poured into the pallets down the chutes 12 and 13 as the pallets pass below these chutes. Two chutes are provided in order that a comparatively dry or facia-mix may be run into the molds first, after which a more liquid mix may be added. This method of material feed provides also for the use of a colored face portion for the block if desired, the coloring material being supplied only to the facia-mix.

As the conveyor 6 and its pallets pass forwardly into the compacting conveyor 17, the members 32 of the lower conveyor are pressed down upon the material by the roller 20 and thus compact and give it the desired upper contour. It will be noted that this compacting occurs through a rocking movement, the forward end of the member first engaging the material and similarly being the first to leave the material.

The form of apparatus shown in Figures 1 to 4 has an advantage over that shown in Figure 5 in that with the same rapidity of conveyor movement, a longer period of compression is afforded the blocks.

As the conveyor 6 is turned downwardly by the pulley 8, the pallets 14 extend forward horizontally until engaged by the rolls of the roll table 15 along which they are carried by the pressure of the succeeding pallets until they bring up against the stop 15'. The pusher 24 operates against the side of the pallets to thrust them laterally across the members 23 and on to the car 28 upon which they may be rolled to a suitable steaming or curing chamber. The operating pulley 26 of the pusher may be connected by any desired gearing to the means driving the conveyor 6 so that it operates periodically at the proper intervals.

It will be noted that the pallets 14 serve as the actual molds for the lower face and for the ends of the blocks, the lower conveyor 6 serving as the mold simply for the sides of the blocks. There is therefore no tendency for the blocks to be broken on leaving the lower conveyor although the material is still quite moist, since the separation of the members 30 from the pallets by the downward movement of these members affords a direct sliding break of contact between the sides of these members and the blocks. With apparatus of this character the formation of the blocks is a continuous process and large numbers of blocks may be formed in short periods of time. The blocks will be uniform in shape and in strength and a minimum of manual labor is required.

I claim:

1. Apparatus for making building block comprising a conveyor, block-holding pallets removably carried by said conveyor, a second mold-carrying means adapted to bring the secondary molds into working relation with the pallets and conveyor, and a roll table in substantial alignment with the working run adapted to receive the pallets at the end of the working run of the conveyor.

2. Apparatus for making building block comprising a conveyor, block-holding pallets removably carried by said conveyor, a second mold-carrying means adapted to bring the secondary molds into working relation with the pallets and conveyor, a table adapted to receive the pallets at the end of the working run of the conveyor, and means adapted to push the pallets out of alignment with the conveyor.

Signed at Duluth, Minn., this 29th day of December, 1920.

ARTHUR G. HATCH.